United States Patent
Farion

[19]

[11] Patent Number: 5,827,357
[45] Date of Patent: Oct. 27, 1998

[54] SEPARATOR AND METHOD FOR SEPARATING COMPONENTS OF PRESSURIZED DRILLING FLUID RETURNS

[75] Inventor: Raymond Richard Farion, Red Deer, Canada

[73] Assignee: Northland Production Testing Ltd., Canada

[21] Appl. No.: 784,245

[22] Filed: Jan. 15, 1997

[51] Int. Cl.$^6$ .................................................. B01D 19/00
[52] U.S. Cl. .............................. 95/253; 95/261; 96/182; 96/209; 96/211; 96/216; 96/220; 210/512.2
[58] Field of Search ............................ 95/253, 260, 261; 96/182, 183, 208, 209, 216, 211, 220; 210/519, 521, 539, 540, 512.1, 512.2; 166/105.5, 265

[56] References Cited

U.S. PATENT DOCUMENTS

| | | | |
|---|---|---|---|
| 1,970,784 | 8/1934 | Walker ........................................ | 95/253 |
| 2,757,582 | 8/1956 | Freeman et al. ....................... | 95/261 X |
| 2,808,123 | 10/1957 | Walker .................................. | 95/253 X |
| 2,849,930 | 9/1958 | Freeman et al. .......................... | 95/261 |
| 2,942,689 | 6/1960 | Walker et al. .......................... | 95/253 X |
| 3,064,410 | 11/1962 | Wright .................................. | 96/183 X |
| 3,421,622 | 1/1969 | Wurtmann ............................. | 95/261 X |
| 3,985,522 | 10/1976 | Kuhlmann .................................. | 95/261 |
| 4,000,989 | 1/1977 | Dunegan ................................ | 95/260 X |
| 4,428,839 | 1/1984 | Davies et al. .......................... | 96/183 X |
| 4,596,586 | 6/1986 | Davies et al. .......................... | 96/209 X |
| 5,256,171 | 10/1993 | Payne ..................................... | 95/260 X |
| 5,415,776 | 5/1995 | Homan .................................... | 210/519 |

OTHER PUBLICATIONS

Reference Checked Was Cited by Applicant on p. 2 of Specification.

*Primary Examiner*—Richard L. Chiesa
*Attorney, Agent, or Firm*—Sheridan Ross P.C.; Douglas W. Swartz

[57] ABSTRACT

The separator includes a vertical cylindrical pressure vessel having elliptical top and bottom heads. A mechanical device, referred to as a vortex tube cluster of vertical tubes, is mounted in the upper section of the vessel chamber, spaced above the bottom head to define a lower chamber section for fluid and solids separation. Pressurized drilling fluid returns are directed tangentially into the vortex tubes and a subsequent centrifugal action is generated. Contained gas separates and forms a gas vortex which exits upwardly from the vortex tubes and vessel top. The liquids and solids discharge into the vessel lower chamber section where solids settle by gravity to the bottom. The solids are withdrawn from the base of the vessel by a slurry pump. The oil and water components of the fluid layer also separate by gravity and are individually removed from the vessel.

4 Claims, 5 Drawing Sheets

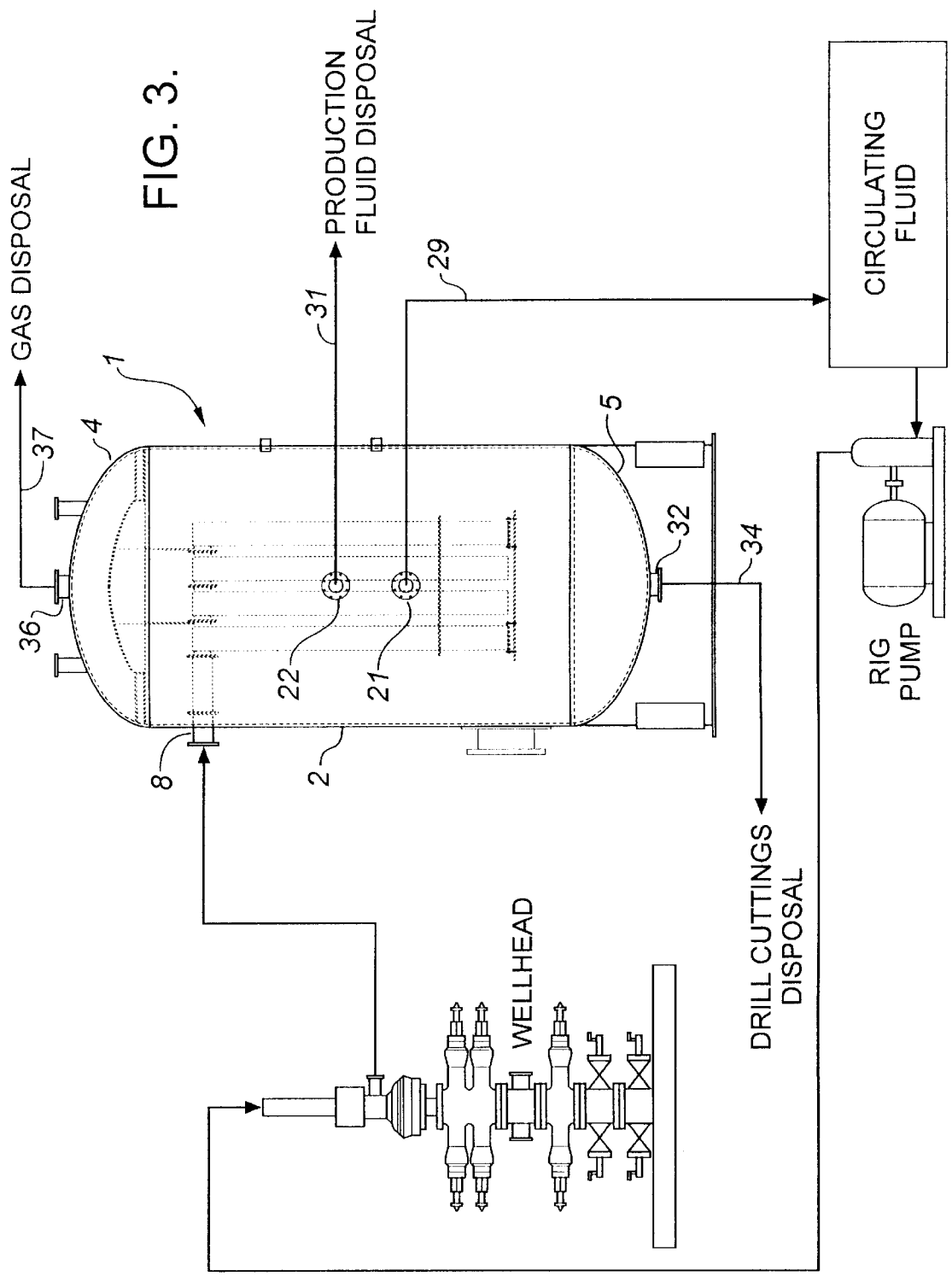

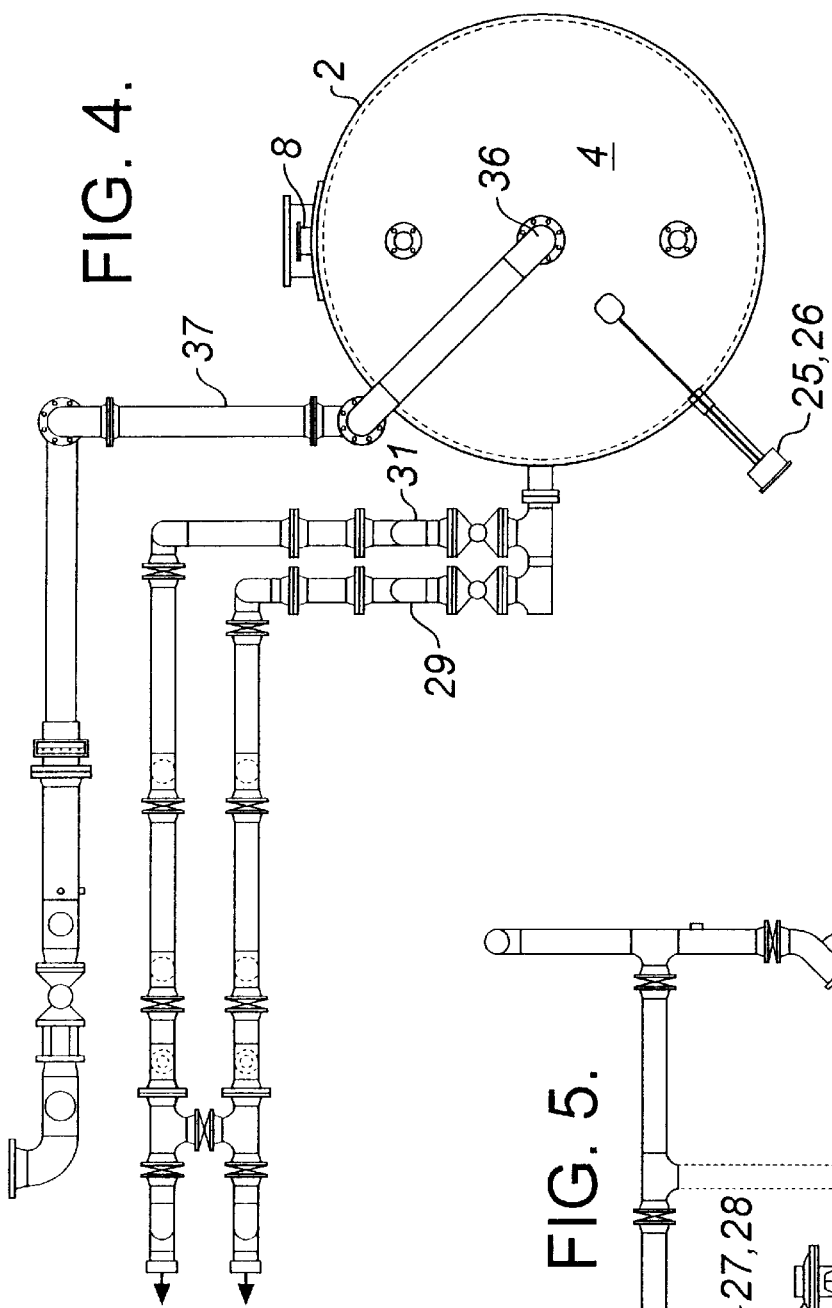
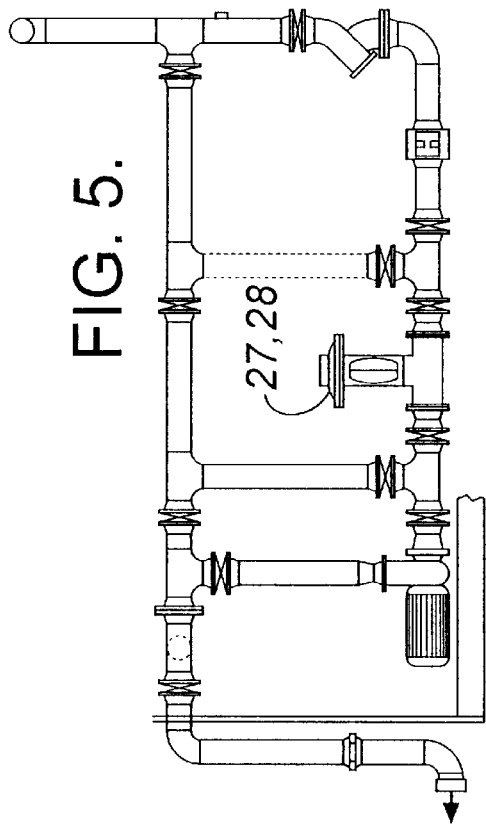

SEPARATOR AND METHOD FOR SEPARATING COMPONENTS OF PRESSURIZED DRILLING FLUID RETURNS

FIELD OF THE INVENTION

The invention relates to a pressure vessel separator for continuously separating the liquid, solid and gas components of pressurized drilling fluid returns, produced from a well undergoing drilling. The separator utilizes a mechanical device, that creates centrifugal action to firstly separate the gas and solids from the liquid, followed by gravity separation under quiescent conditions to separate liquid hydrocarbons from water. The solids, gases, liquid hydrocarbons and water are independently removed from the separator. The invention also relates to the method practised.

BACKGROUND OF THE INVENTION

The invention is an improvement of a prior art separator and method described in U.S. Pat. No. 5,415,776 (Homan).

This prior art separator is used to separate the components of pressurized drilling fluids returning from a well undergoing drilling, usually "underbalanced" or "multiphase flow" drilling.

Underbalanced drilling involves lightening drilling fluid (such as water or diesel oil) with a gas (typically nitrogen). This is done so that the column of lightened drilling fluid in the wellbore exerts a bottom hole pressure that is less than the pressure in the formation being drilled. As a result, the drilling fluid does not invade the formation. If it were to do so, the well productivity could be adversely affected. Underbalanced drilling of a well may cause reservoir liquids and gas to enter the circulating drilling fluid. Furthermore, the drilling fluid is circulated under pressure. As a result, the drilling fluid returns, leaving the wellbore, are under pressure and typically comprise a mixture of solids, liquids and gases. The solids commonly comprise coarse bit cuttings and "fines". The liquids can comprise the original drilling liquid as well as formation or reservoir fluids. And the gases can include the lightening gas and formation gas.

The drilling fluid returns, therefore, need to be handled with pressure-containing equipment. It is also necessary to separate the gases, liquids and solids so that they are recovered as separate streams. The solids are removed. The gases may be re-used or vented. And finally it is desirable to separate the hydrocarbons from the balance of the liquid.

Pressure vessel separators for separating liquid/gas/solids components of a stream have long been common in the oilfield equipment art. However, these prior art separators are not adapted to process drilling fluid returns, which contain large quantities of coarse bit cuttings and experience severe fluid slugging. Instead, drilling fluid returns have almost entirely been processed using shale shakers and open mud tank systems, which would not be environmentally safe or sound especially in the presence of $H_2S$ gas. These systems are not capable of handling pressurized returns.

The previously mentioned Homan patent discloses a separator for separating the components of pressurized drilling fluid returns. The separator involves:

An elongate, horizontal, cylindrical pressure vessel having elliptical heads closing its ends. The commercial embodiment of this vessel has a typical diameter of 8 feet and a length of 30 feet;

A returns feed pipe extends into the vessel at its first end. The feed pipe connects with an involute structure designed to reduce the velocity of the incoming feed before discharging it;

A hopper-like compartment is located beneath the involute structure, for receiving the incoming returns. The compartment is defined by the head, the vessel's curved sidewalls and a slanted weir forming the downstream end of the compartment;

An outlet, at the base of the compartment, is connected with a pump, for withdrawing of a solids slurry while drilling fluid continues to enter the separator;

The chamber downstream of the slanted weir is provided with outlets at different elevations for removing gravity-separated water and liquid hydrocarbons; and The vessel has an overhead outlet for removing gases.

In operation, the coarse bit cuttings settle out by gravity in the inlet compartment and are concentrated as they are funnelled down to the pump. Solids are removed from the vessel without interfering with ongoing drilling and continuous production of drilling fluid returns. The gas breaks out and is removed for venting, flaring or re-using. The liquid overflows the compartment weir and separates by gravity separation into hydrocarbon and water layers. These liquids are individually removed through suitable outlets.

The patented separator (developed by the present assignee) has been commercially successful. However there is on-going need to reduce the size of the separator, both to reduce the vessel cost and transportability for smaller wellsites and/or off-shore drilling platforms.

The present invention is directed to achieving these ends.

SUMMARY OF THE INVENTION

In accordance with the preferred form of the present invention, there is provided a separator comprising:

A vertical cylindrical pressure vessel forming an internal chamber;

A tapered feed pipe extending into the upper end of the chamber, for introducing pressurized drilling fluid returns;

A cluster of vertical, cylindrical vortex tubes connected with the feed pipe, with each tube having an inlet at its upper end. The inlet is arranged so that returns are tangentially introduced into each tube. The tube has transverse top and bottom walls, the top wall having a central opening for gas outflow, the tube sidewall having peripheral bottom openings for liquid and solids outflow;

A vortex breaker plate is situated below the vortex tubes for stopping the gas vortex from reaching the fluid section;

The vessel sidewall section, that extends down from the bottom of the vortex tubes, and the curved bottom head together form a lower chamber section;

The solids settle out in the lower chamber section and are concentrated as they move to a central bottom outlet formed by the head, the outlet being connected with a solids slurry withdrawal pump. The liquid migrates upward; forming a liquid layer in the vessel chamber;

The vessel sidewall has water and hydrocarbon outlets situated above the bottom of the vortex tubes at different elevations. These outlets serve to individually discharge oil and water into discharge lines;

A transverse baffle is located above the vortex cluster tubes—the gas flows upwardly and contacts the baffle, for removal of entrained liquid in the gas;

The vessel has an outlet, at its upper end, for discharging gases into a gas line; and The vessel has means, such as floats, for controlling the discharge of water and hydrocarbons through their discharge outlets, as well as to maintain pre-determined fluid levels.

In operation, the feed pipe delivers equal amounts of drilling fluid returns at about the same velocity into each of the several vortex tubes forming the cluster. The incoming fluid enters tangentially into each tube. A central gas vortex is formed, which discharges upwardly out of the tube into the upper reaches of the vessel chamber, impinging on a baffle. The gases are discharged through the gas outlet and gas line. The solids concentrate as a downwardly moving, rotating layer pressing against the inside surface of the tube. The liquid concentrates as a downward moving, rotating layer between the solids and the gas. The solids and liquids contained inside each vortex tube are forced downward to the bottom of the tube and are discharged through the peripheral bottom openings. The bottom section of the tubes may have a vortex breaker plate or a series of elbows to eliminate the vortex. In the lower chamber section, the solids settle downward, concentrated by the curved head, and are subsequently withdrawn by the slurry pump through the bottom outlet. The liquid leaving the tubes collects and forms a separate layer external to the vortex cluster in the chamber. This layer submerges the bottom of the vortex tubes and keeps the gas vortex from reaching the discharged liquid. As a result, the solids and the liquid in the vessel chamber remain relatively quiescent. This enables efficient separation of the liquid and solids. The liquid in the layer further separates into water and hydrocarbon layers, which are individually removed.

It has been found that a much smaller sized vessel, in accordance with the invention, will provide efficient separation comparable to the prior art horizontal vessel.

In one broad aspect, the invention comprises a separator for separating the liquid, solids and gas components of pressurized drilling fluid returns from a well undergoing drilling, comprising: a vertical cylindrical pressure vessel having top and bottom end walls and a side wall, said walls forming an internal chamber; a cluster of vertical vortex tubes positioned within the chamber and located above the vessel's bottom end wall, so that a chamber bottom section extends below the bottom ends of the vortex tubes; each vortex tube having a side wall forming a bore, said side wall having an inlet at its upper end for tangentially introducing the returns into the bore, the vortex tube being open at its upper end and closed by a transverse plate at its lower end and having at least one peripheral opening at its lower end for discharging the liquid and solids; means for feeding returns to each vortex tube through its inlet; the vessel bottom wall being elliptical and having a central outlet; means for withdrawing solids through the vessel bottom wall outlet; outlet means for discharging gas from the upper end of the vessel; and outlet means, located above the bottom ends of the vortex tubes, for discharging hydrocarbons and water separately through the vessel side wall.

In another broad aspect, the invention comprises a method for separating the components of pressurized drilling fluid returns produced from a well undergoing drilling, said fluid comprising bit cuttings, liquid, which may include produced oil, and gas, comprising: providing a vertical pressure vessel having top, bottom and side walls which form an internal chamber, said vessel containing at least one vertical vortex tube having a top opening, a closed bottom end and a peripheral side opening at its bottom end, said vessel having a returns feed pipe connected with the upper end of the vortex tube for feeding returns tangentially to the inner surface of the vortex tube, the bottom end of the vortex tube being spaced above the vessel bottom wall so that the vessel chamber includes a bottom section between the vessel bottom wall and the bottom end of the vortex tube, the vessel bottom wall having a central outlet at the base thereof for solids removal, the vessel side wall having liquid discharge outlets spaced above the bottom end of the vortex tube, the vessel having a gas outlet at its upper end, said method comprising: feeding returns tangentially into the upper end of the vortex tube so that they rotate downward through the tube bore and form a central gas vortex, an outer layer of solids and an inner layer of liquid; discharging the gas out of the upper end of the vortex tube and through the gas outlet; discharging liquid and solids from the vortex tube through its peripheral opening into the chamber bottom section and temporarily retaining them in the chamber so that they separate by gravity separation under quiescent conditions to form a bottom layer of solids and an upper layer of liquid; withdrawing solids through the vessel's bottom wall outlet while maintaining the inflow of returns into the vessel; and discharging liquid through the liquid discharge outlets at restricted rates so that the bottom outlet of the vortex tube remains submerged.

BRIEF DESCRIPTION OF THE DRAWING

FIG. 3 is a process schematic of the separator assembly, showing the flow directions and discharge lines;

FIG. 4 is a top plan view of the separator showing its discharge lines;

FIG. 5 is a side view of the liquid discharge lines; and

DESCRIPTION OF THE PREFERRED EMBODIMENT

Figure 1:
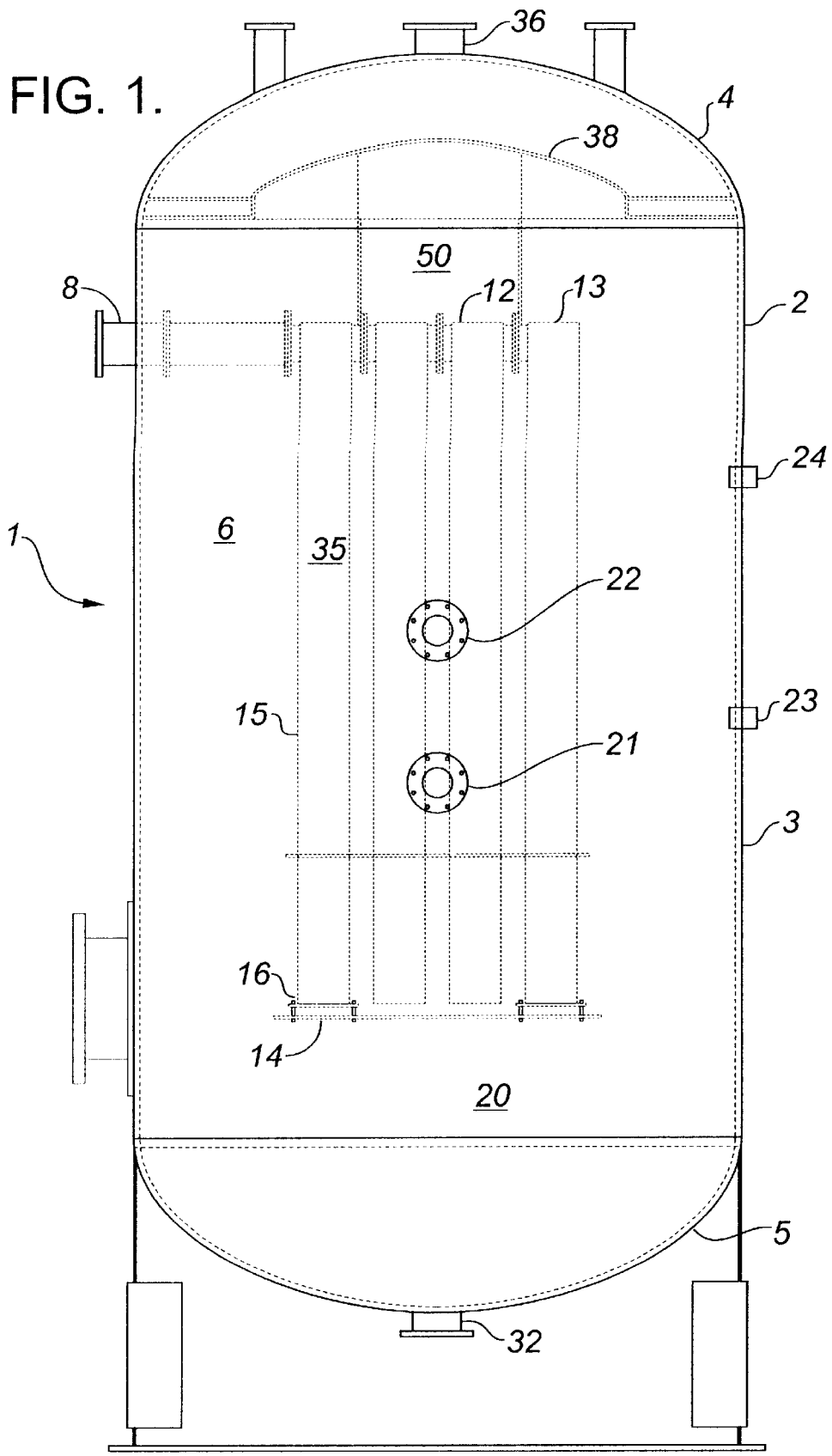
FIG. 1 is a side view of the separator, showing the internals in shadow lines.
Figure 2:
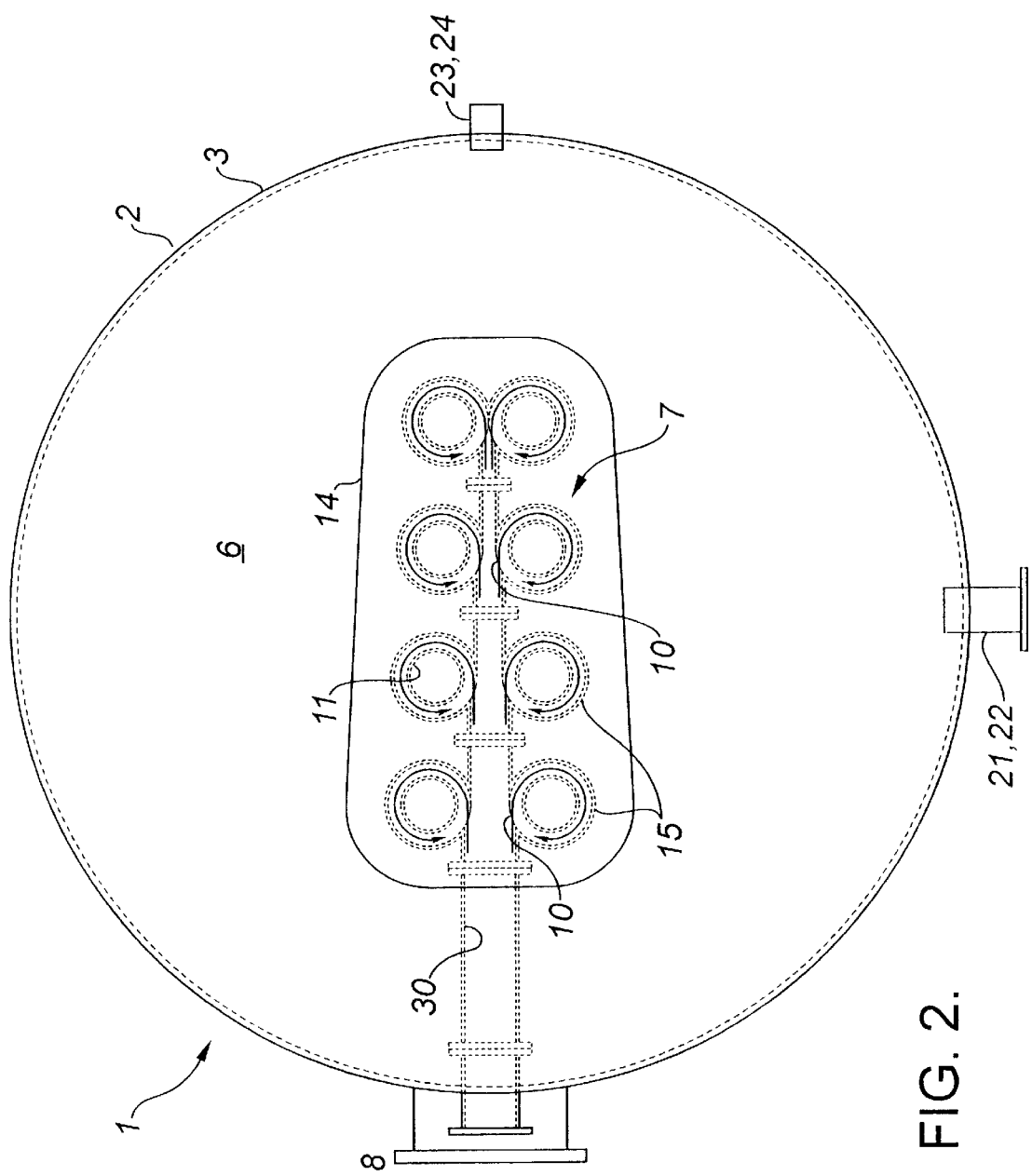
FIG. 2 is a top view of the separator.
Figure 6:
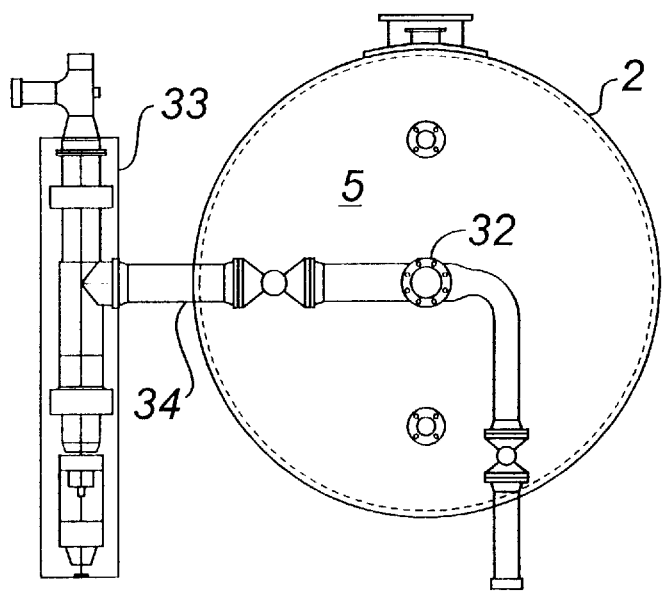
FIG. 6 is a bottom view showing the solids slurry removal assembly.

The separator 1 comprises a vertical cylindrical pressure vessel 2 having a side wall 3 and elliptical top and bottom heads 4,5. The vessel forms an internal chamber 6.

A known vortex tube cluster assembly 7 is mounted in the chamber 6. This assembly is available from Porta-Test International Inc., Edmonton, Alberta.

The assembly 7 comprises a tapered feed pipe 8 and one or more vertical vortex tubes 9 connected thereto. Each vortex tube has an inlet 10 at its upper end which communicates with the bore 30 of the feed pipe 8. The connection of the feed pipe 8 with each vortex tube inlet 10 is such that incoming returns are fed tangentially relative to the inner surface 11 of the vortex tube. The vortex tube 9 has a transverse top wall 12 forming a central opening 13 for the release of the gas component. The vortex tube also has a transverse bottom wall 14 closing its bottom end. The vortex tube side wall 15 forms peripheral openings 16 at its bottom end for the discharge of liquid and solids. The tapered feed pipe 8 is designed to supply approximately equal amounts of returns to each vortex tube at about the same fluid velocity.

A horizontal vortex breaker plate 14 is suspended from the bottom ends of the vortex tubes 9 in close proximity to the peripheral openings 16. The breaker plate 14 extends laterally beyond the vortex tubes but is inwardly spaced from the vessel side wall 3.

The bottoms of the vortex tubes 9 are spaced above the bottom head 5, so as to form a lower section 20 of the chamber 6. The tops of the vortex tubes 9 are spaced below the top head 4 to form an upper section 50 of the chamber 6.

A pair of liquid outlets 21, 22 extend through the vessel side wall 3 at positions above the bottoms of the vortex tubes 9. The outlets 21, 22 are vertically spaced apart whereby the lower outlet 21 is used to discharge water and the upper outlet 22 discharges oil. A pair of openings 23, 24 are positioned above the liquid outlets 21, 22 respectively. Conventional float assemblies 25, 26 are mounted in the openings 23, 24 to actuate conventional dump valves 27, 28 to maintain predetermined liquid levels as well as to control the discharge of water and oil through lines 29, 31 respectively.

The bottom head 5 forms a central outlet 32 which is connected to a slurry pump 33 by a solids discharge line 34. The pump 33 is used to withdraw solids form the base of the separator under pressure while the inflow of the returns is continued.

Installed in the top head 4 is a central baffle deflector 38, against which the gas impinges, to trap residual liquid droplets in the gas. The deflector 38 is inwardly spaced from the vessel side wall 3. The gas discharges through outlet 36 which connects with a gas discharge line 37.

In operation, the incoming returns are tangentially introduced through feed pipe 8 and inlets 10 into the bores 35 of the vortex tubes 9. Each vortex tube receives about the same amount of returns moving at about the same velocity. In each vortex tube, the returns stream components separate under the influence of centrifugal force to form: a central gas vortex, which reverses itself and exits upwardly through the opening 13, across the baffle 38 and exits through outlet 36 and gas discharge line 37; an outer layer of solids which rotates downward through the vortex tube bore 35 and discharges through the vortex tube bottom peripheral openings 16; and an intermediate layer of liquid located between the gas vortex and the solids layer, which also rotates downward through the vortex tube bore 35 and also discharges through the bottom peripheral openings 16. In the chamber lower section 20, the solid bit cuttings settle and separate from the liquid. The cuttings are concentrated as they funnel through the diminishing cross-sectional area defined by the bottom head 5 and are withdrawn from the chamber 6 by the pump 33 and are discharged through the line 37. The liquid collects as a separate layer in the chamber 6 above the solids layer. Oil and water separate in this layer by gravity separation. The water and oil are individually dumped through lines 29, 31 under the control of float assemblies 25, 26 and dump valves 27, 28. The layer or level of liquid in chamber 6 covers the vortex tube peripheral openings 16 to provide an effective seal that prevents gas from escaping or blowing out of the vortex tube bottom openings.

The separation process in the separator is characterized by the following advantages:

the gas is efficiently separated in the vortex tubes, and is removed as an upwardly moving stream, so that it does not create a turbulence that would disturb liquid and solids;

the solids and liquids separate efficiently in the chamber outside the vortex tubes, under quiescent conditions;

there is improved efficiency of the separation process utilizing a mechanical device (vortex cluster); and due to these improved efficiencies, a smaller sized vessel can be used.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

The embodiments of the invention in which an exclusive property or privilege is claimed are defined as follows:

1. A separator for separating the liquid, solids and gas components of pressurized drilling fluid returns from a well undergoing drilling, comprising:

a vertical cylindrical pressure vessel having top and bottom end walls and a side wall, said walls forming an internal chamber;

a cluster of vertical vortex tubes positioned inside the vessel chamber between the vessel top and bottom walls, so that upper and lower chamber sections extend above and below the vortex tubes;

each vortex tube having a side wall forming a bore, said side wall having an inlet at its upper end for tangentially introducing returns into the bore, the vortex tube being open at its upper end and closed by a transverse wall at its lower bottom end, said side wall forming at least one peripheral opening at its lower end for discharging liquid and solids;

means for feeding returns to each vortex tube through its inlet;

the vessel bottom wall being elliptical and having a central outlet;

means for withdrawing solids through the vessel bottom wall outlet;

outlet means for discharging gas from the upper chamber section; and outlet means, located above the bottom ends of the vortex tubes, for discharging liquids through the vessel side wall.

2. The separator as set forth in claim 1 wherein the vessel side wall forms vertically spaced apart water and hydrocarbon liquid outlets positioned above the bottom ends of the vortex tubes.

3. The separator as set forth in claim 2 comprising:

a transverse baffle positioned in the upper chamber section between the gas outlet means and the vortex tubes, for deflecting gas flow therebetween to remove residual liquid in the gas.

4. A method for separating the components of pressurized drilling fluid returns from a well undergoing drilling, said fluid comprising bit cuttings, liquid, which may include produced oil, and gas, comprising:

providing a vertical pressure vessel having top, bottom and side walls which form an internal chamber, said vessel containing at least one vertical vortex tube having a top opening, a closed bottom and a peripheral opening at its bottom end, said vessel having a returns feed pipe connected with the upper end of the vortex tube to feed returns tangentially to the inner surface of the vortex tube, the bottom of the vortex tube being spaced above the vessel bottom wall so that the vessel chamber includes a bottom section between the vessel bottom wall and the bottom of the vortex tube, the bottom wall having a central outlet at the base thereof, the vessel side wall having vertically spaced apart oil and water discharge outlets spaced above the bottom of the vortex tube, the vessel having a gas outlet at its upper end;

feeding returns into the upper end of the vortex tube so that they rotate downward through the tube bore and form a central gas vortex, an outer layer of solids and an inner layer of liquid;

discharging the gas out of the upper end of the vortex tube and through the gas outlet;

discharging liquid and solids from the vortex tube through its peripheral opening into the chamber bottom section and temporarily retaining them in the chamber so that they separate by gravity separation under quiescent conditions to form a bottom layer of solids and an upper layer of liquid;

withdrawing solids through the vessel's bottom wall outlet while maintaining the inflow of returns into the vessel; and discharging separate individual streams of oil and water through the liquid discharge outlets at restricted rates so that the bottom outlet of the vortex tube remains submerged in liquid at all times.

* * * * *